(12) United States Patent
Schlehuber (10) Patent No.: US 6,378,299 B1
(45) Date of Patent: Apr. 30, 2002

(54) ENGINE EXHAUST COOLING SYSTEM

(76) Inventor: Fred J. Schlehuber, 131 Huron Trail, St. Ignace, MI (US) 49781

( * ) Notice: Subject to any disclaimer, the term of this patent is extended or adjusted under 35 U.S.C. 154(b) by 0 days.

(21) Appl. No.: 09/810,754

(22) Filed: Mar. 16, 2001

(51) Int. Cl.[7] .............................................. F01N 3/04
(52) U.S. Cl. .......................... 60/310; 60/298; 60/320
(58) Field of Search ...................... 60/310, 320, 321, 60/298

(56) References Cited

U.S. PATENT DOCUMENTS

| | | |
|---|---|---|
| 3,485,040 A | 12/1969 | Niskanen |
| 3,530,665 A | 9/1970 | Wagner |
| 3,630,030 A | 12/1971 | Wagner |
| 3,664,135 A | 5/1972 | Lirette |
| 3,765,479 A * | 10/1973 | Fish .............................. 165/50 |
| 3,779,213 A * | 12/1973 | Knudsen ....................... 60/310 |
| 3,886,738 A * | 6/1975 | Sien .............................. 60/310 |
| 4,184,566 A | 1/1980 | Baker et al. |
| 4,214,443 A * | 7/1980 | Herenius ....................... 60/321 |
| 5,554,057 A * | 9/1996 | Abe et al. ....................... 60/310 |
| 5,554,058 A * | 9/1996 | LeQuire ....................... 60/310 |
| 5,904,042 A | 5/1999 | Rohrbaugh |

* cited by examiner

*Primary Examiner*—Thomas Denion
*Assistant Examiner*—Diem Tran
(74) *Attorney, Agent, or Firm*—McGarry Bair LLP (57) ABSTRACT

A system for cooling the exhaust of a marine diesel engine, including a water can having a central exhaust flow passage, and inner and outer walls defining a water manifold, a water source fluidly connected to the water manifold for supplying water to the water manifold, a plurality of apertures passing from the manifold into the central exhaust flow passage, and a plurality of dispersion vanes, each dispersion vane aligned over a corresponding one of the plurality of apertures, whereby water supplied by the water source to the water manifold passes through each aperture and strikes a dispersion vane. The water striking the dispersion vanes forms a fine water mist having an increased available surface area for efficiently transferring the latent heat of vaporization from the exhaust flow to the water mist without causing a high back pressure in the exhaust flow passage.

20 Claims, 6 Drawing Sheets

ENGINE EXHAUST COOLING SYSTEM

BACKGROUND OF THE INVENTION

1. Field of the Invention

The invention relates to an engine exhaust cooling system, particularly for a marine diesel engine. The exhaust cooling system uses a small volume of water, which is atomized into a very fine mist. Due to atomization the mist vaporizes into steam. In one of its aspects, the invention relates to an engine exhaust cooling system utilizing the fine mist of water, efficiently convertible to steam, to take advantage of the latent heat of vaporization of steam to cool the exhaust flow.

2. Description of the Related Art

Modern marine diesel engines incorporate turbochargers for increasing the mass of intake air mixed with fuel for combustion. The turbocharger comprises a turbine driven by the exhaust gases of the engine itself. Efficient operation of the turbocharger requires that the exhaust gases be allowed flow freely, without the development of significant back pressure in the exhaust system. There is a requirement, however, for cooling the exhaust flow without the generation of high back pressure. In the past, water-cooled exhaust systems have used large orifices and higher pressures which resulted in a large volume of sea water entering the exhaust mixing chamber. The large water volume rendered the traditional mixing/water can very inefficient. As higher horsepower engines are being used and higher enthalpy is created, the demand for a more efficient cooling system is required.

A pollution control and cooling device for exhaust systems is known in U.S. Pat. No. 3,664,135 to Lirette, wherein a plurality of water streams are injected into an exhaust flow of a marine engine. The solid fine spray disclosed in Lirette creates a wall of substantial depth fully intersecting the exhaust as it emanates from an exhaust manifold. The introduction of a solid spray into an exhaust stream raises known issues, however, in that when the solid spray of water is introduced into the exhaust, very little of the water will flash to steam, creating high back pressures and very little temperature reduction in the exhaust system. Water in heavy streams serve as a heat sink capable of absorbing 1 BTU/lb for each degree Fahrenheit, whereas the latent heat of vaporization of water to steam is 970 BTU/lb.

It would be advantageous to provide an engine exhaust cooling system that efficiently cools the exhaust gases and does so without developing high back pressures in the exhaust system that will detrimentally effect the operation of an exhaust-driven turbocharger and the engine.

SUMMARY OF THE INVENTION

The invention relates to an engine exhaust cooling system for a marine diesel engine including a cooling water source, a cooling water manifold fluidly connected to the cooling water source, an exhaust conduit adapted to be fluidly connected to an exhaust outlet of a marine diesel engine, at least one fluid conduit fluidly connecting the cooling water manifold with the exhaust conduit, and at least one dispersion vane associated with the at least one fluid conduit, whereby water passing from the water manifold through the at least one fluid conduit strikes the at least one dispersion vane and develops a water mist for absorbing the latent heat of vaporization from the exhaust flow.

In a further embodiment, the at least one fluid conduit comprises an aperture through a wall separating the cooling water manifold and the exhaust conduit.

In a further embodiment of the invention, the at least one dispersion vane is aligned directly over the aperture.

In a further embodiment, the invention includes a first wall defining at least a portion of the exhaust conduit and at least a portion of the cooling water manifold.

In a further embodiment of the invention, the engine exhaust cooling system further comprises a second wall, wherein the at least one fluid conduit comprises an aperture through the second wall.

In a further embodiment of the invention, the at least one dispersion vane is aligned directly over the aperture.

In a further embodiment of the invention, the first wall is parallel to a longitudinal axis of the exhaust conduit. In a further embodiment of the invention, the engine exhaust cooling system further comprises a second wall, wherein the at least one fluid conduit comprises an aperture through the second wall. In a further embodiment of the invention, the at least one dispersion vane is arranged over the aperture.

In a further embodiment of the invention, the second wall describes an angle of 33 degrees with the plane of the first wall.

In a further embodiment of the invention, the dispersion vane comprises a planar sheet portion having a first edge aligned over the aperture.

In a further embodiment of the invention, the planar sheet portion is perpendicular to the second wall. In a further embodiment of the invention, the first edge is parallel to the second wall. In a further embodiment of the invention, the planar sheet portion further comprises a second edge aligned over the aperture. In a further embodiment of the invention, the second edge is perpendicular to the first edge.

A further embodiment of the invention relates to a marine internal combustion engine including a turbocharger having a turbine driven by exhaust gases generated by the engine, the turbocharger for generating compressed intake air for the engine, and an engine exhaust cooling system for cooling the exhaust gases after passage through the turbine, the cooling system including a water can having an inner cylindrical wall and an outer cylindrical wall concentric with the inner cylindrical wall, the inner and outer cylindrical walls being connected to each other by continuous upper and lower annular walls, the inner and outer cylindrical walls and the upper and lower annular walls defining a water manifold therebetween, a water source fluidly connected to the water manifold for supplying water to the water manifold, a plurality of apertures passing normally through the upper annular wall, and a plurality of dispersion vanes, each dispersion vane aligned over a corresponding one of the plurality of apertures, whereby water supplied by the water source to the water manifold passes through each of the plurality of apertures and strikes a corresponding dispersion vane.

In a further embodiment of the invention, the upper annular wall defines an angle of 33 degrees with a longitudinal axis of the water can.

A further embodiment of the invention relates to a marine craft driven by an internal combustion engine including a turbocharger having a turbine driven by exhaust gases generated by the engine, the turbocharger for generating compressed intake air for the engine, and an engine exhaust cooling system for cooling the exhaust gases after passage through the turbine, the cooling system including a cooling water source, a cooling water manifold fluidly connected to the cooling water source, an exhaust conduit fluidly connected to an exhaust outlet of the turbocharger, at least one fluid conduit fluidly connecting the cooling water manifold with the exhaust conduit, and at least one dispersion vane associated with the at least one fluid conduit, whereby water passing from the water manifold through the at least one fluid conduit strikes the at least one dispersion vane and develops a water mist for absorbing the latent heat of vaporization from the exhaust flow.

DESCRIPTION OF THE PREFERRED EMBODIMENT

Figure 1:
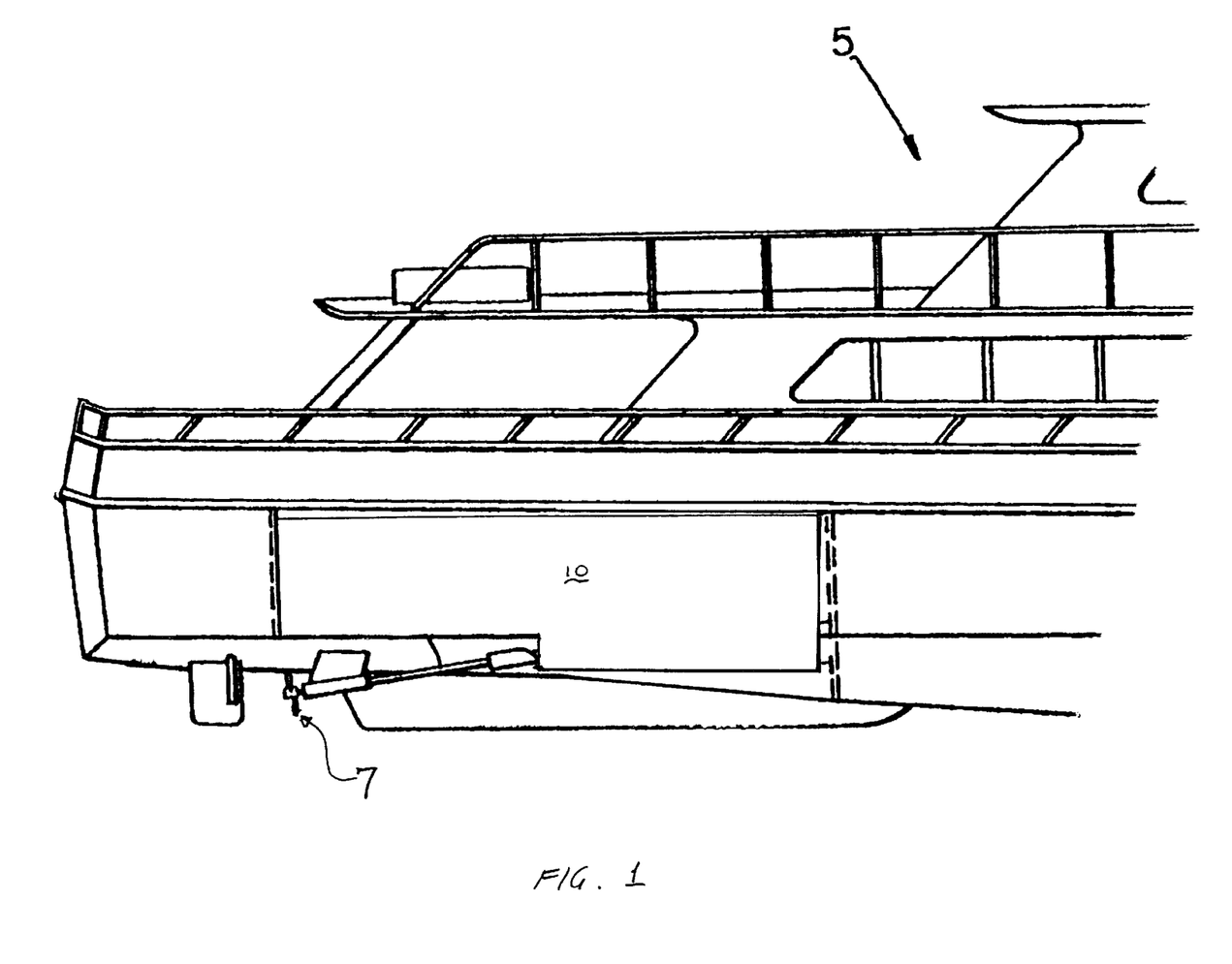
FIG. 1 is partial depiction of a marine craft having an engine and exhaust cooling system according to the invention.
Figure 2:
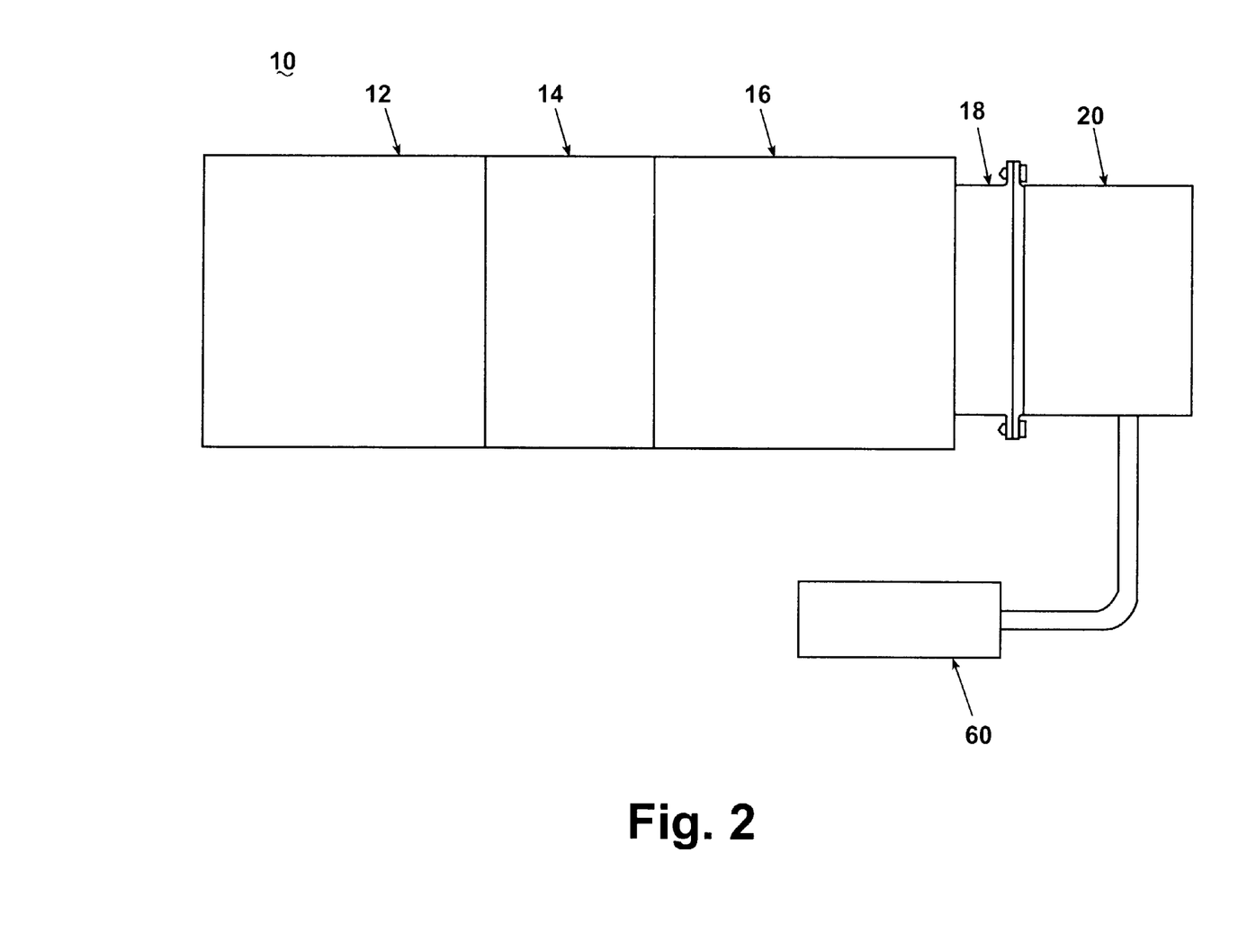
FIG. 2 is a schematic representation of the engine and exhaust cooling system of FIG. 1.

Referring to FIGS. 1–2, a marine craft 5 is propelled by a screw 7 driven typically by a marine diesel engine 12 that comprises a portion of an engine and exhaust cooling system 10. The engine and exhaust cooling system 10 according to the invention comprises the marine diesel engine 12, an exhaust manifold 14, a turbocharger 16, turbocharger exhaust 18 and water can 20. Engine 12 requires the input of diesel fuel and oxygen for combustion and generation of motive force for the screw 7. The diesel fuel and oxygen must be mix ed in a precise ratio for most efficient combustion and generation of power. It has been found that compression of the air supplied to the engine 12 for combustion aids in approaching this preferred ratio. It is common practice to employ post combustion (exhaust) gases from the engine 12, as released through exhaust manifold 14, to drive a compressor turbine in a turbocharger 16 for compression of intake air for the engine 12. These gases, upon passing from turbocharger 16 to a turbocharger exhaust 18, then must be cooled before being released from the system 10. The gases pass from turbocharger exhaust 18 to mixing/water can 20, wherein cooling can occur. The water can 20 described herein is further useful for cooling exhaust in engine systems of different configurations.

Figure 3:
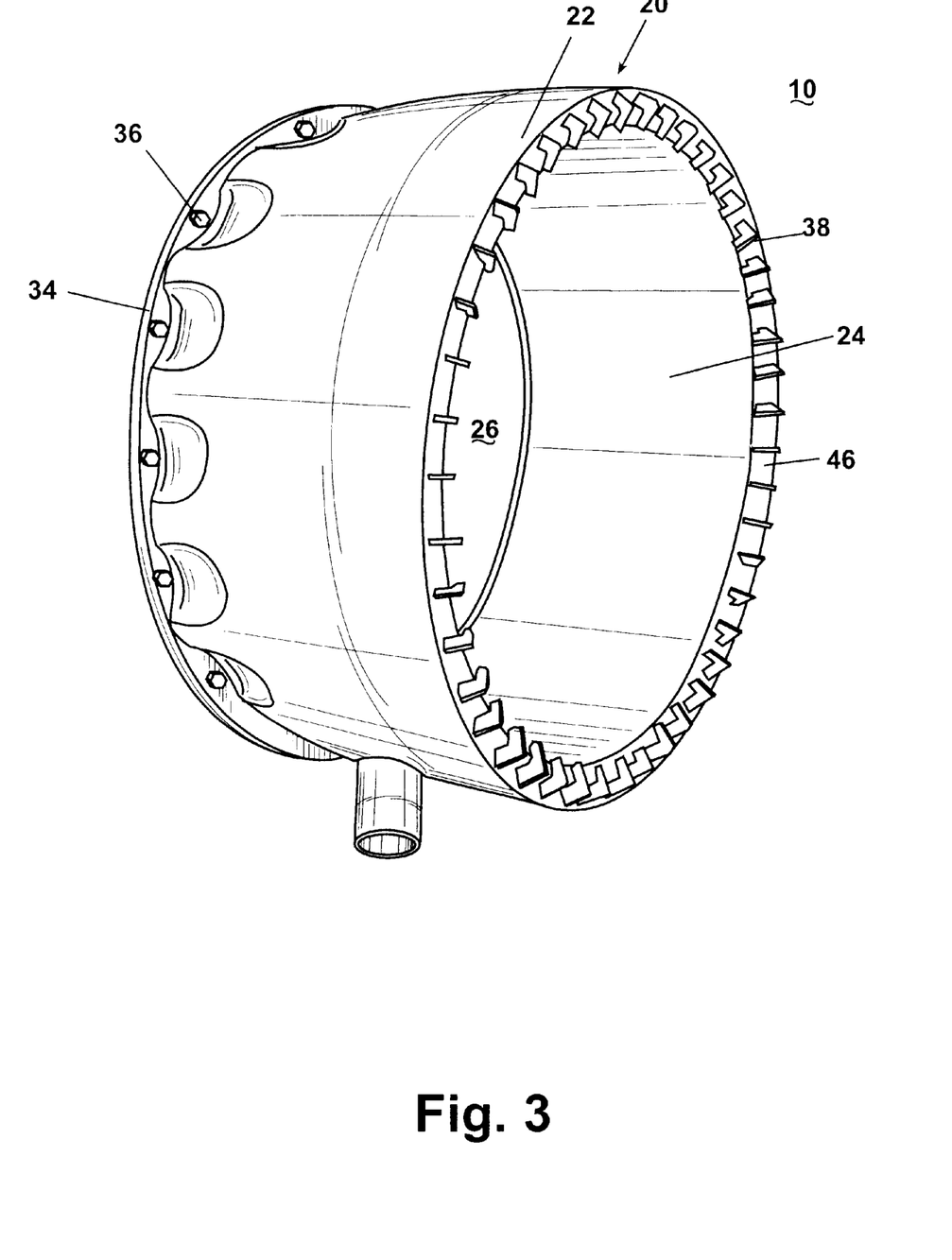
FIG. 3 is a perspective view of a water can of the engine exhaust cooling system of FIGS. 1–2.

Referring now to FIG. 3, water can 20 comprises an outer cylindrical wall 22 and a concentric inner cylindrical wall 24. Inner cylindrical wall 24 defines a central cylindrical passage 26 therein along its longitudinal axis. The outer cylindrical wall 22 and inner cylindrical wall 24 define a toroidal water supply manifold 28 therebetween, as further seen in FIGS. 5 and 6. At a first end of water can 20, a mounting flange 34 includes a number of fastener apertures 36 for mechanically connecting the water can 20 to turbocharger exhaust 18 or to an engine exhaust conduit. The toroidal water supply manifold 28 defined between inner and outer cylindrical walls 22, 24 is closed at the first end defined by mounting flange 34 and at a second end by an annular wall in the form of a canted vane-mounting sill 46 inclined toward the longitudinal axis of the inner and outer cylindrical walls 22, 24. A plurality of dispersion vanes 38 are mounted to the sill 46. In the preferred embodiment depicted, the dispersion vanes 38 are substantially planar, and are arranged about the sill 46 so that the plane of each dispersion vane 38 passes through the longitudinal axis of the water can 20.

The dispersion vanes 38 each have a vane mounting leg 40 secured, such as by welding, to the sill 46. Each of the vanes 38 further includes a vane dispersion leg 42 situated normally to the vane mounting leg 40, such that the vane dispersion leg 42 is aligned substantially parallel to the sill 46. The sill 46 further includes a number of water dispersion apertures 48, each water dispersion aperture 48 corresponding to a dispersion vane 38. The dispersion vanes 38 are arranged to directly align the vane dispersion leg 42 over the water dispersion aperture 48. More particularly, the vane dispersion point 44, shown in FIG. 6, is aligned directly over the water dispersion aperture 48.

Figure 4:
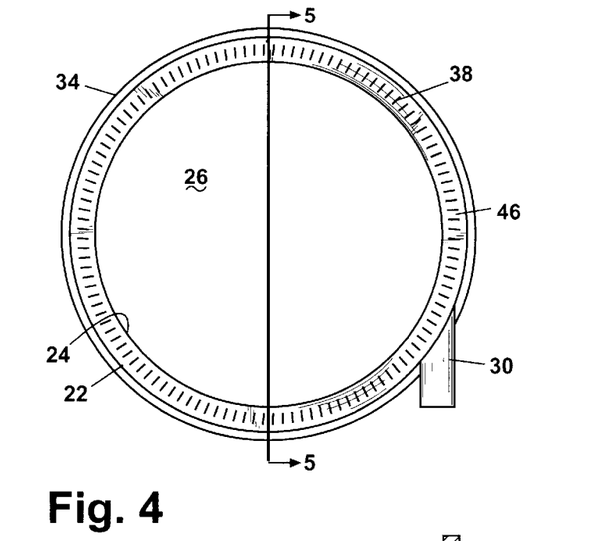
FIG. 4 is a plan view of the water can of FIG. 1.
Figure 5:
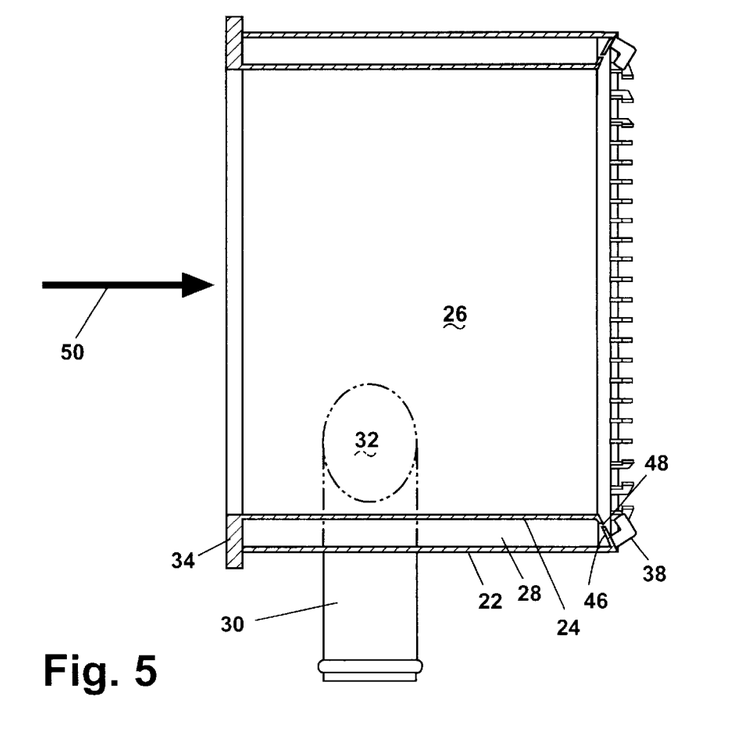
FIG. 5 is a cross-sectional view taken through line 5—5 of FIG. 4.

Referring to FIGS. 4–5, water can 20 further includes a water supply conduit 30 fluidly connected to water supply manifold 28 through water supply inlet 32. Water supply conduit 30 is fluidly connected to a water source such as water pump 60 (see FIG. 2). In the marine application, the water pump 60 supplies the manifold 28 with water drawn from the surrounding body of water.

Figure 6:
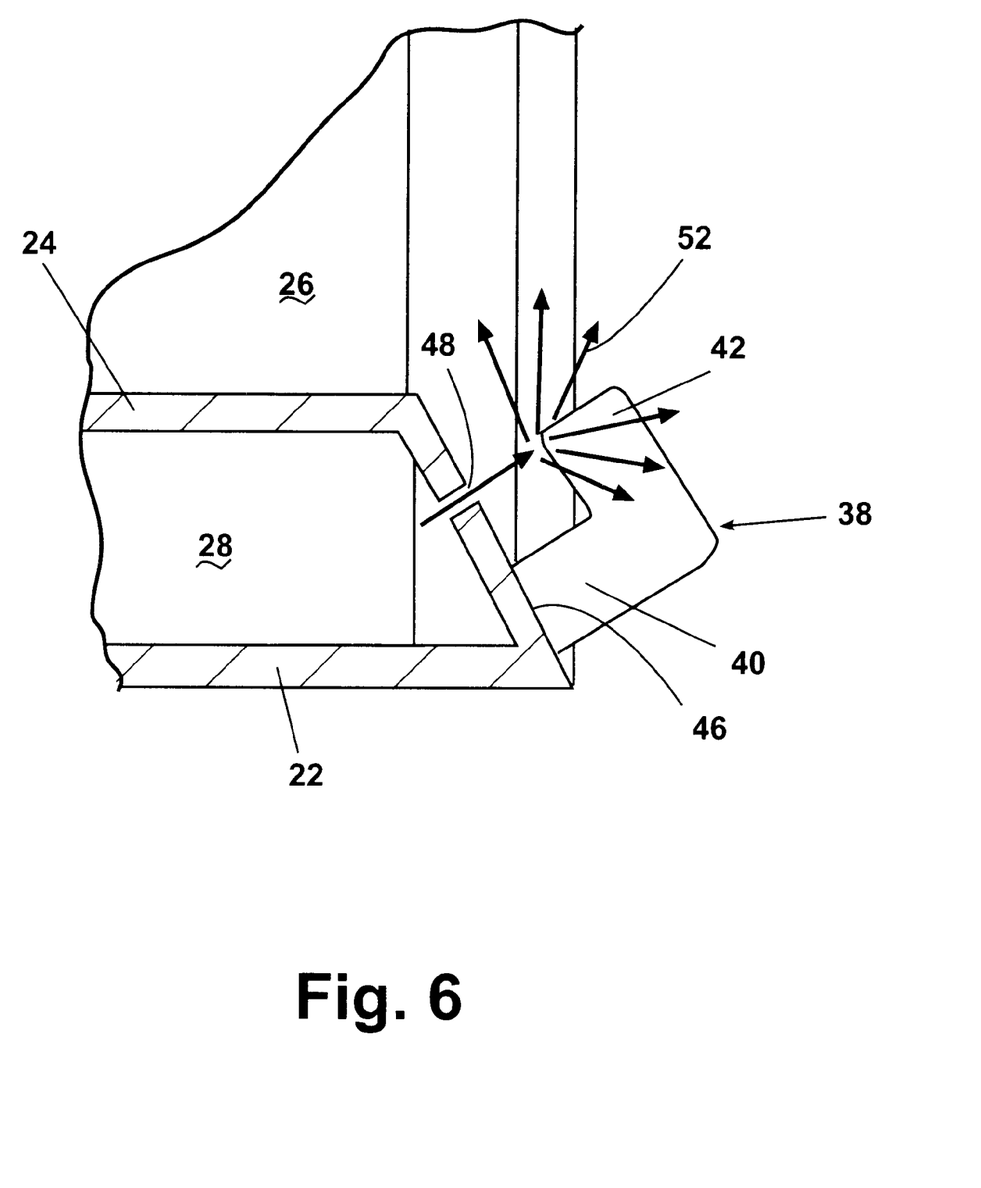
FIG. 6 is an enlarged cross-sectional view of the water can of FIG. 5.
Figure 7:
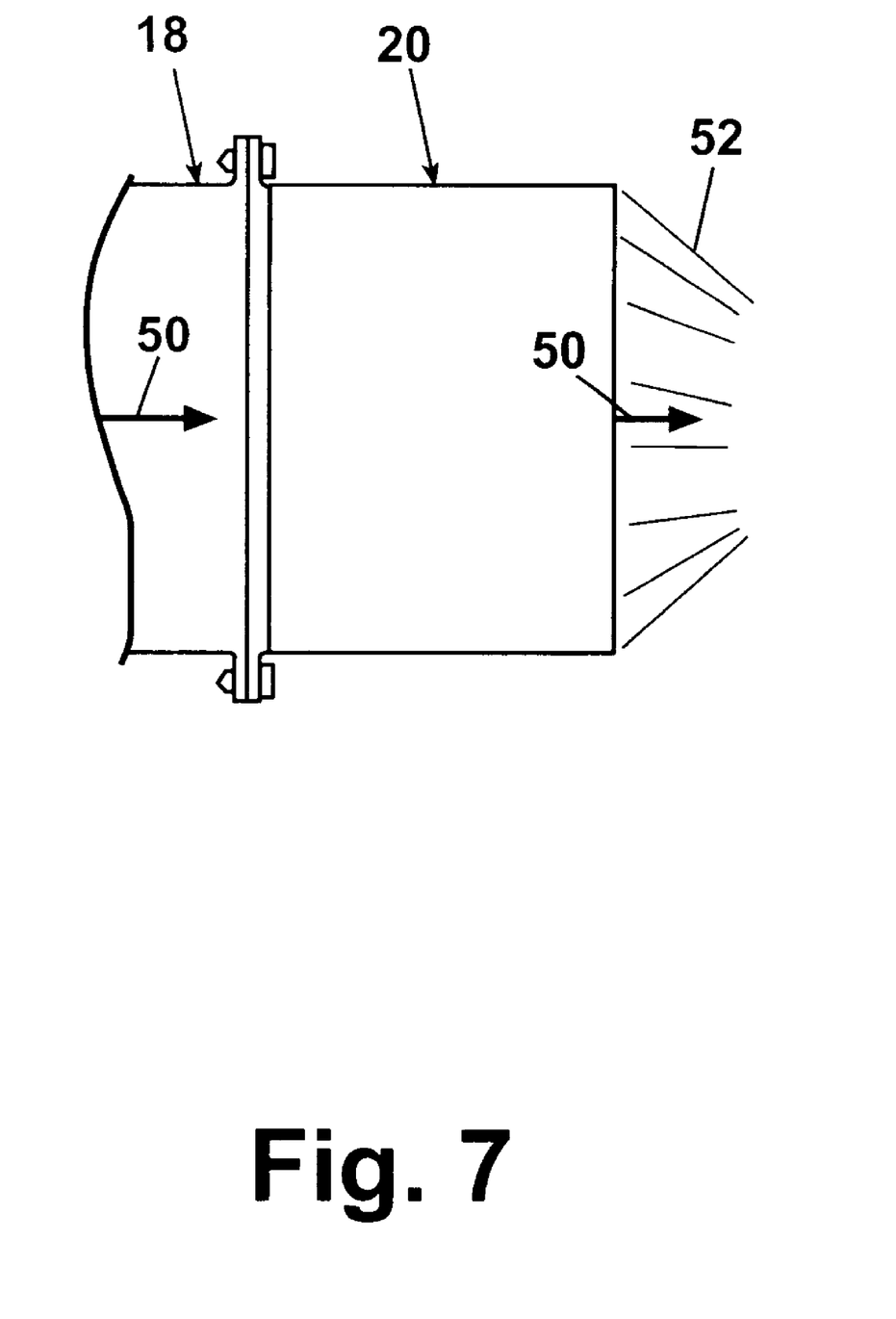
FIG. 7 is a side view of the water can of FIGS. 1–6 showing a water spray developed by the engine exhaust cooling system according to the invention.

Referring to FIGS. 6–7, water provided from the water pump 60 to the water supply conduit 30 and thus to the water supply manifold 28 is expelled through the dispersion apertures 48. After exiting the dispersion aperture 48, the water impinges upon the dispersion point 44 of the corresponding dispersion vane 38. This breaks up the water stream and disperses it into a fine water mist 52 directed substantially inwardly into the cylindrical passage 26 of the water can 20. The number of apertures 48 of a predetermined size is selected to create a predetermined rate of flow of cooling water. The exit speed of the water from a given aperture 48 must be maintained within a particular range to ensure proper dispersion upon striking the associated vane dispersion point 44. It has been found that water passed through an aperture size of ⅛ inches under a pressure of ten psi from the pump 60, upon striking the dispersion point 44 produces a sufficient dispersion of the water. The rate of flow of cooling water is predetermined to match the exhaust flow 50 of the diesel engine 12 so that sufficient cooling water mist 52 interacts with the exhaust flow 50 from the engine for the conversion of heat from the exhaust into latent heat of vaporization of the water mist 52, without the introduction of excess water which would interfere with proper exhaust of the combustion products, or develop high back pressures which would interfere with the operation of the turbine of the turbocharger.

As exhaust flow 50 from the engine passes through the central cylindrical passage 26 of the water can 20, it encounters the fine water mist 52 developed by the engine exhaust cooling system 10. As the high temperature exhaust flow 50 strikes the fine water mist 52, the water mist 52 flashes to steam. The latent heat of vaporization required to flash the water mist 52 to steam is absorbed from the exhaust flow 50, thereby cooling the exhaust flow 50.

Prior endeavors to use the latent heat vaporization of a fine water mist in an exhaust flow of a turbocharged diesel engine have failed predominantly because the water was not sufficiently dispersed. A heavier water spray presented insufficient surface area for efficient conversion of the water mist to steam. The efficiency of these prior art systems are extremely low. This extremely low efficiency of the prior art system required a very large quantity of water be introduced into the exhaust conduit to generate sufficient cooling effect. Increasing the efficiency of the system, such that a greater percentage of cooling water flashes to steam, greatly reduces the total quantity of water that must be introduced into the exhaust conduit. The latent heat of vaporization of water at atmospheric pressure, 970 BTU/lb, versus the 1 BTU/lb absorbed in merely heating the water, provides an overwhelming advantage for the system that demonstrates greater efficiency in converting water to steam. Existing engine systems can require 250 gallons per minute of cooling water flow through a prior art exhaust cooling system to meet the cooling demands of the exhaust. An engine exhaust cooling system according to the invention can provide an equivalent degree of cooling with a cooling water flow of 30 gallons per minute, and further without the detrimental effects of the high backpressures on the turbine-driven turbocharger.

By experimentation it has been found that the preferred embodiment utilizes a water dispersion aperture 48 of approximately ⅛ inch diameter in conjunction with a dispersion vane 38 aligned so that the dispersion point 44 is aligned over the dispersion aperture 48. This produces a degree of vaporization of the water mist 52, increasing the effective surface area of the water mist 52, to provide an efficient transfer of heat from the exhaust to the water mist 52, causing a greater percentage of the water mist 52 to flash to steam. Further, in the preferred embodiment, it has been determined that canting the vane mounting sill 46 at an approximate angle of 33 degrees from the longitudinal axis of the central cylindrical passage 26 results in an optimum dispersion of the water mist 52 across the entirety of cylindrical passage 26. Prior art devices having a larger aperture provide a water stream that is insufficiently dispersed for proper transfer of heat to the water, while apertures small enough to generate a sufficiently dispersed water mist unaided have been found to be susceptible to clogging. The selection of the size of the water dispersion aperture 48 overcomes the problem found in prior art devices wherein finer apertures are clogged by fine particles carried in sea water by directing the output from the water dispersion aperture 48 against dispersion vane 38 to generate a water mist 52 having the necessary fineness and particle surface area for efficient conversion to steam.

The engine exhaust cooling system according to the invention utilizes the latent heat of vaporization. This system thus reduces the volume of exhaust, lowers the temperature, and reduces exhaust backpressures. This invention uses very small orifices that direct the water stream to a vertical vane that causes the water to be dispersed into a fine mist. This mist or fog creates an environment that allows the fog to turn into steam, thus capturing the latent heat of vaporization. The energy that was in the form of heat (temperatures) is now changing the water into steam, which lowers the volume of the exhaust and also reduces the temperature. The breaking up of the water from heavy streams into a fine mist provides more surface area for the mist to turn into steam.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

What is claimed is:

1. An engine exhaust cooling system for a marine diesel engine, comprising:

a cooling water source;

a cooling water manifold fluidly connected to the cooling water source;

an exhaust conduit adapted to be fluidly connected to an exhaust outlet of a marine diesel engine;

at least one fluid conduit fluidly connecting the cooling water manifold with the exhaust conduit; and at least one dispersion vane associated with the at least one fluid conduit, whereby water passing from the water manifold through the at least one fluid conduit strikes the at least one dispersion vane and develops a water mist for absorbing the latent heat of vaporization from the exhaust flow.

2. The engine exhaust cooling system of claim 1, wherein the at least one fluid conduit comprises an aperture through a wall separating the cooling water manifold and the exhaust conduit.

3. The engine exhaust cooling system of claim 2, wherein the at least one dispersion vane is aligned directly over the aperture.

4. The engine exhaust cooling system of claim 1, further comprising a first wall defining at least a portion of the exhaust conduit and at least a portion of the cooling water manifold.

5. The engine exhaust cooling system of claim 4, further comprising a second wall, wherein the at least one fluid conduit comprises an aperture through the second wall.

6. The engine exhaust cooling system of claim 5, wherein the at least one dispersion vane is aligned directly over the aperture.

7. The engine exhaust cooling system of claim 4, wherein the first wall is parallel to a longitudinal axis of the exhaust conduit.

8. The engine exhaust cooling system of claim 7, further comprising a second wall, wherein the at least one fluid conduit comprises an aperture through the second wall.

9. The engine exhaust cooling system of claim 8, wherein the at least one dispersion vane is arranged over the aperture.

10. The engine exhaust cooling system of claim 8, wherein the second wall describes an angle of 33 degrees with the plane of the first wall.

11. The engine exhaust cooling system of claim 10, wherein the dispersion vane comprises a planar sheet portion having a first edge aligned over the aperture.

12. The engine exhaust cooling system of claim 11, wherein the planar sheet portion is perpendicular to the second wall.

13. The engine exhaust cooling system of claim 12, wherein the first edge is parallel to the second wall.

14. The engine exhaust cooling system of claim 11, wherein the first edge is parallel to the second wall.

15. The engine exhaust cooling system of claim 14, wherein the planar sheet portion further comprises a second edge aligned over the aperture.

16. The engine exhaust cooling system of claim 15, wherein the second edge is perpendicular to the first edge.

17. The engine exhaust cooling system of claim 11, wherein the planar sheet portion further comprises a second edge aligned over the aperture.

18. A marine internal combustion engine including a turbocharger having a turbine driven by exhaust gases generated by the engine, the turbocharger for generating compressed intake air for the engine, and an engine exhaust cooling system for cooling the exhaust gases after passage through the turbine, the cooling system comprising:

a water can having an inner cylindrical wall and an outer cylindrical wall concentric with the inner cylindrical wall, the inner and outer cylindrical walls being connected to each other by continuous upper and lower annular walls, the inner and outer cylindrical walls and the upper and lower annular walls defining a water manifold therebetween;

a water source fluidly connected to the water manifold for supplying water to the water manifold;

a plurality of apertures passing normally through the upper annular wall; and a plurality of dispersion vanes, each dispersion vane aligned over a corresponding one of the plurality of apertures, whereby water supplied by the water source to the water manifold passes through each of the plurality of apertures and strikes a corresponding dispersion vane.

19. The system of claim 18, wherein the upper annular wall defines an angle of 33 degrees with a longitudinal axis of the water can.

20. A marine craft driven by an internal combustion engine including a turbocharger having a turbine driven by exhaust gases generated by the engine, the turbocharger for generating compressed intake air for the engine, and an engine exhaust cooling system for cooling the exhaust gases after passage through the turbine, the cooling system comprising:

a cooling water source;

a cooling water manifold fluidly connected to the cooling water source;

an exhaust conduit fluidly connected to an exhaust outlet of the turbocharger;

at least one fluid conduit fluidly connecting the cooling water manifold with the exhaust conduit; and at least one dispersion vane associated with the at least one fluid conduit, whereby water passing from the water manifold through the at least one fluid conduit strikes the at least one dispersion vane and develops a water mist for absorbing the latent heat of vaporization from the exhaust flow.

* * * * *